United States Patent [19] [11] 4,182,203
Drury [45] Jan. 8, 1980

[54] CONTINUOUSLY VARIABLE MECHANICAL TRANSMISSION

[76] Inventor: Marcus D. Drury, 2766 Doresta Rd., San Marino, Calif. 91108

[21] Appl. No.: 881,110

[22] Filed: Feb. 24, 1978

[51] Int. Cl.² .............................................. F16H 35/08
[52] U.S. Cl. ........................................ 74/834; 74/30; 74/45
[58] Field of Search ...................... 74/834, 30, 45, 119, 74/120, 121, 122, 123, 124, 125, 131

[56] References Cited

U.S. PATENT DOCUMENTS

| | | | |
|---|---|---|---|
| 651,828 | 6/1900 | Copland | 74/53 |
| 1,226,549 | 5/1917 | McLain | 74/834 |
| 3,224,284 | 12/1965 | McElheny et al. | 74/119 |
| 3,646,822 | 3/1972 | Pocaterra | 74/53 |

*Primary Examiner*—C. J. Husar
*Assistant Examiner*—Conrad Berman
*Attorney, Agent, or Firm*—Jessup & Beecher

[57] ABSTRACT

A continuously variable mechanical transmission comprised of a crankshaft or similar device driven by a suitable power source such as an internal combustion engine, which drives one or more pivotally mounted levers, pushrods and ratchet mechanisms. The levers drive pushrods which in turn drive the ratchet mechanism through a rack gear mounted on each pushrod. The output of the ratchet gear mechanism drives an output shaft and is varied by varying the position of the pushrod attachment to each pivotally mounted lever. Each pushrod is connected to a slot or guide on each lever so that the connecting point can be varied from close to the pivot point or pivot axis to the opposite end of the lever. By this means it can be continuously varied from low speed to higher speed by adjusting the connecting point of the pushrods to the pivoting levers.

19 Claims, 10 Drawing Figures

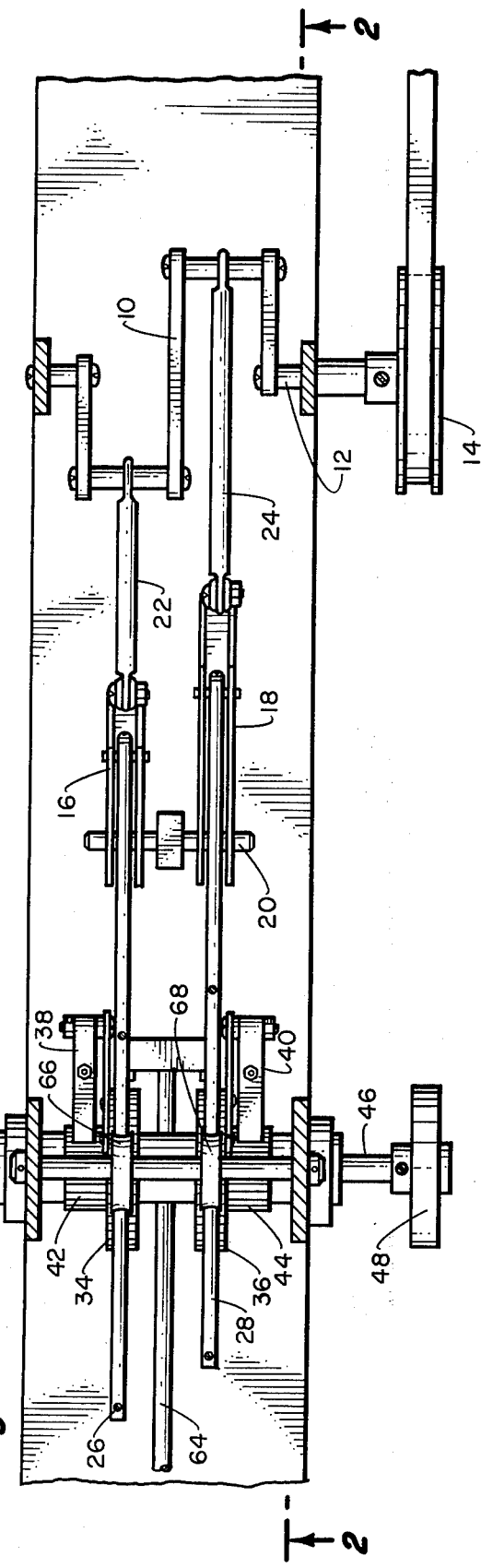

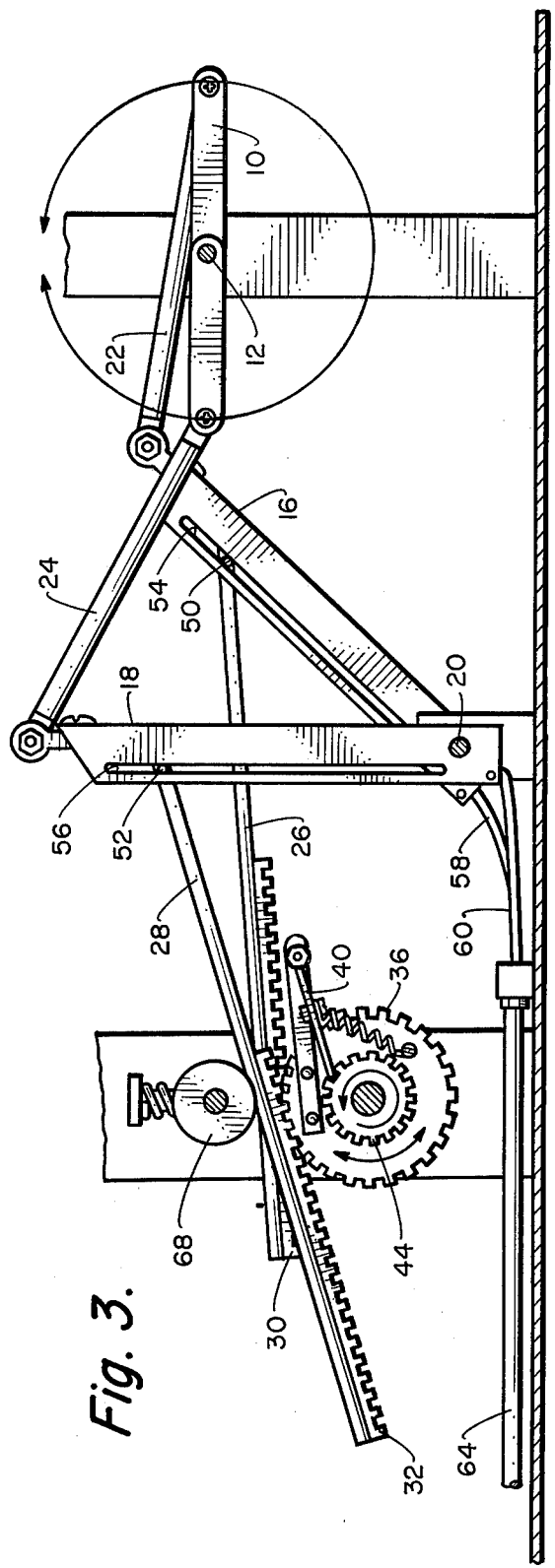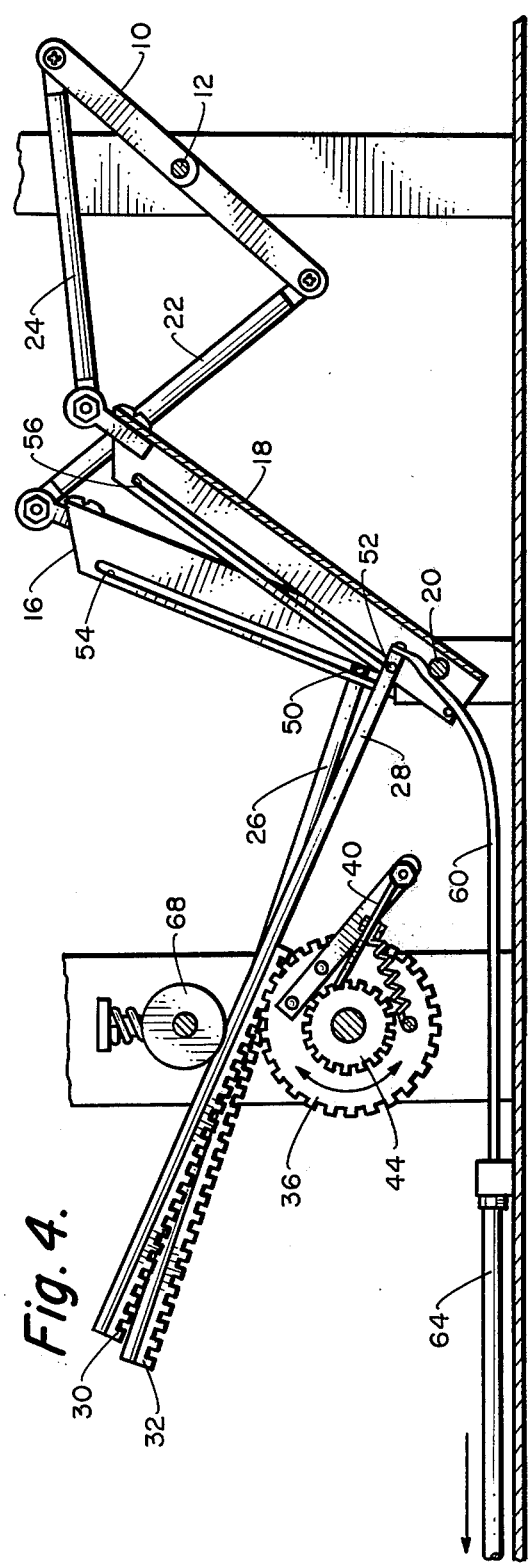

CONTINUOUSLY VARIABLE MECHANICAL TRANSMISSION

BACKGROUND OF THE INVENTION

The present invention relates generally to automatic transmissions and more particularly relates to a continuously variable mechanical transmission.

At present, fluid-operated automatic transmissions dominate the field because of their smoothness, long endurance, and high power transmission capability, but these devices are by no means ideal. In the present automatic transmissions, the angle of the stator blades does not vary according to slip ratio which can produce losses due to hydraulic shock. Because of the rapid fall of efficiency, for increased stator blade angle, planetary automatic shifting is required. This complicates the mechanism and decreases the reliability.

The most common mechanical transmission in use today is the sliding gear (standard) transmission which is a very efficient component, but it is incapable of automatically changing the speed ratio without manually changing the gears. Most power sources can operate only over a small speed range with good economy and power. As a result, a large number of gear changes are required for efficient operation and in fact some trucks have up to sixteen forward gears.

The present automatic and manual transmissions in use do not maximize operating economy and power through a constant maintenance of rpms at the top of the power curve. Further, these transmissions do not have the smoothest acceleration possible because they must have stepped ratio changes to provide either manual change or automatic operation.

SUMMARY OF THE INVENTION

The purpose of the present invention is to provide a continuously variable mechanical transmission having as smooth an acceleration possible by utilizing a stepless transmission ratio change, thereby maintaining highest possible power and economy.

The present invention provides a continuously variable stepless ratio change transmission through pivoting lever arms connected to a pushrod driving a ratchet gear through a gear rack mounted on each pushrod. The lever arms are mounted for oscillatory rotation about an axis and the variation of speed is provided by varying the connecting point of the pushrod on the lever from close to the axis of rotation to the end of the lever arm furthest from the axis of rotation. Each lever arm is driven by a crankshaft and connecting rods driven by a source of power, such as an internal combustion engine.

The invention can also be employed with a camshaft in place of the crankshaft and lever arms employing automatic variable ratio changing apparatus in the form of motors driving rack gears which are located inside each lever, to which each pushrod is linked to each respective lever. The pushrods are connected to bearing pads riding in guides in the lever arms and the connecting point can be linked for variation according to the rpm and load on the engine.

It is one object of the present invention to provide a continuously variable mechanical transmission.

Another object of the present invention is to provide a continuously variable mechanical transmission having a stepless ratio variation.

Still another object of the present invention is to provide a continuously variable mechanical transmission which automatically varies the output speed.

Yet another object of the present invention is to provide a continuously variable mechanical transmission having oscillating pivotally mounted lever arms driving pushrods having a variable point of connection.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 1 is a top view of a continuously variable mechanical transmission.

FIG. 2 is a sectional side view taken at 2—2 of FIG. 1.

FIGS. 3 and 4 illustrate the operation of the continuously variable mechanical transmission of FIG. 1.

DETAILED DESCRIPTION OF THE PREFERRED EMBODIMENT

Figure 5:
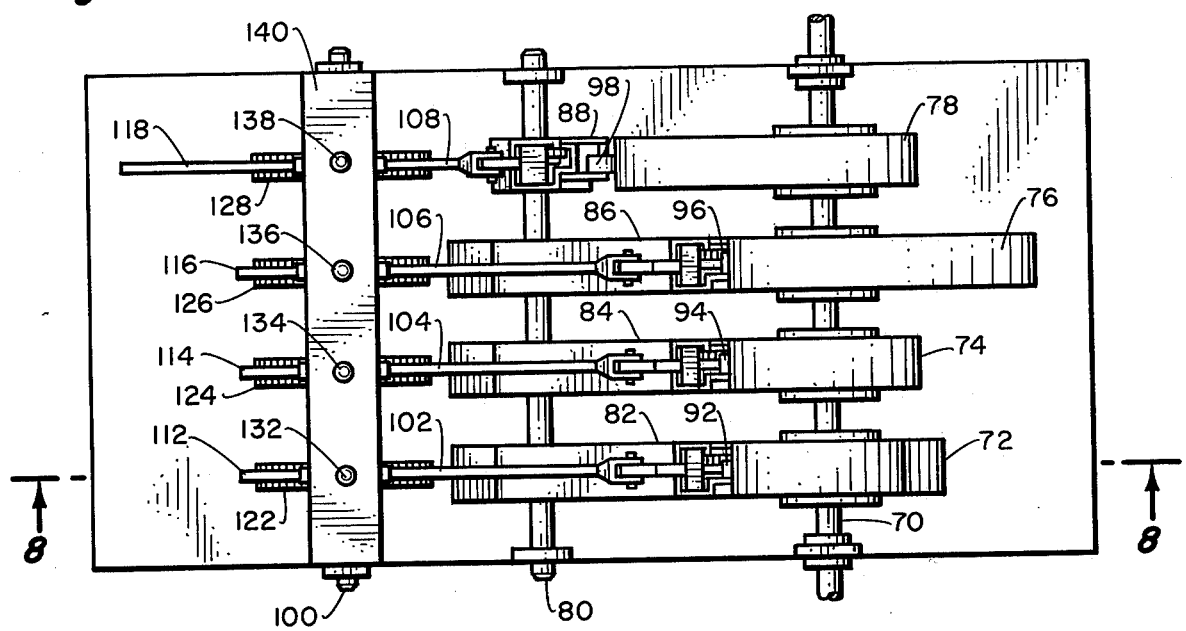
FIG. 5 is a top view of another embodiment of the continuously variable mechanical transmission employing a camshaft.
Figure 9:
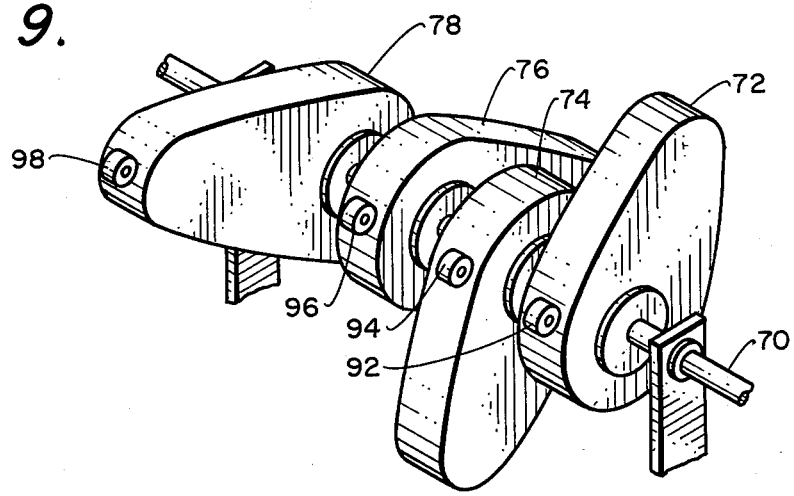
FIG. 9 is a perspective view of the camshaft used for operation on the transmission of FIG. 5.

Referring to FIG. 1, there is shown a crankshaft 10 operated by an input shaft 12 connected to a pulley 14 or other suitable source of power such as an internal combustion engine. The crankshaft 10 in turn operates lever or rocker arms 16 and 18 pivotally mounted for oscillation about pin or rod 20. The rockers or levers 16 and 18 are connected to crankshaft 10 by means of connecting rods 22 and 24.

As the levers 16 and 18 oscillate about the pin 20, they in turn drive pushrods 26 and 28 having gear racks 30 and 32 attached to each rod. The racks 30 and 32 engage free-wheeling gears 34 and 36 rotatably mounted on output shaft 46. Each gear has a ratchet assembly 38 and 40 for engaging gears 42 and 44 fixedly attached to output shaft 46. The output shaft can be used to drive a flywheel 48 or any other suitable device, such as forward, reverse and neutral gears.

The output is varied according to the position at which pushrods 26 and 28 connect to levers 16 and 18. In the embodiment shown, pushrods 26 and 28 are connected by pins 50 and 52 engaged in slots 54 and 56 in the sides of lever arms 16 and 18 which act as guides. Manually operated cables 58 and 60 attached to the ends of each pushrod 26 and 28, as illustrated at 62, permit simultaneous adjustment of the connecting point of the pushrods to the lever arms 16 and 18. The cables 58 and 60 pass through a cable sheath 64 to a suitable control mounted lever (not shown) or other device for manual or automatic operation. Spring-biased wheels 66 and 68 maintain the gear racks 30 and 32 in engagement with the gears 34 and 36.

The operation of the transmission is illustrated in FIGS. 3 and 4 which show respectively high speed and low speed output positions of the pushrods 26 and 28.

As the crankshaft 10 rotates in either direction, the connecting rods 22 and 24 oscillate levers 16 and 18 about the axis of pivot pin 20. This oscillation is transferred through the linkage 50 and 52 to each respective pushrod 26 and 28. As the levers 16 and 18 oscillate, the pushrods 26 and 28 move back and forth in a substantially linear fashion, rotating free-wheeling gears 34 and 36 mounted on output shaft 46. Each time the free-wheeling gears 34 and 36 rotate clockwise, the pawl 39 of ratchet 40 connected to the gear slips on the respective output gear 42 and 44. When the respective pushrod begins to rotate the free-wheeling gear 36 in counterclockwise direction, as can be seen, the pawl on ratchet 40 engages each output gear 42 and 44 rotating the shaft an amount equal to the length of movement of the respective rack 30 and 32 mounted on the pushrods 26 and 28. As can be seen from FIG. 3, with the connecting pins 50 and 52 of the pushrods 26 and 28 moved to the opposite end of the slots 54 and 56 in the lever arms 16 and 18 furthest from the pivot pin 20, maximum motion of the pushrods 26 and 28 is produced, thus resulting in highest speed or highest output.

Conversely, by operation of cables 58 and 60, the pushrods 26 and 28 are moved to the lowest point in slots 54 and 56 closest to the axis of rotation around pivot pin 20, resulting in minimum movement of pushrods 26 and 28, which in turn results in lowest speed or lowest output. Thus, output can be continuously varied by simultaneous operation of cables 58 and 60 to move the connecting point of pushrods 26 and 28 from the end of oscillating levers 16 and 18 furthest from the pivot pin 20 to the end of slots 54 and 56 closest to pivot pin 20 or any point in between.

Suitable means can be provided to automatically operate cables 58 and 60 by sensing the rpm and load on an engine. For example, a device which can be connected to the output of a tachometer which could be switch operated to operate electrical means to move cables 58 and 60. Such a system is particularly suitable for the device illustrated in FIGS. 5 through 10.

Referring to FIG. 5, this embodiment of the transmission is operated by a camshaft 70 having a plurality of cams 72, 74, 76 and 78 with at least four being preferred for driving respective levers 82, 84, 86 and 88 mounted on pivot pin 80. The levers 82, 84, 86 and 88 oscillate around the pivot pin 80 as in the previous embodiment. With the motion imparted to the respective levers by the engagement of the respective cams 72-78 by means of rollers 92, 94, 96 and 98. The camshaft shown in the embodiment of FIG. 5 would be constructed similar to that shown in FIG. 9, with each cam having respective 90° phase or offset. Thus, 76 is offset 90° from 72, with 74 90° offset from 76, and 78 offset 90° from 74. Additional cams or fewer can be used, if desired, with the only limitation being the size or space in which the transmission is to operate. The four cams illustrated, transmit a relatively smooth output from a single rotational input of camshaft 70. The lever arms operate pushrods 102, 104, 106 and 108 having gear racks 112, 114, 116 and 118 engaging the gears on a silent-running roller ratchets 122, 124, 126 and 128. The roller ratchet is in effect very similar to an overrunning clutch in which a friction pawl and ratchet drive has rollers which become wedged between the sleeve and recessed pockets machined in the hub.

Spring-biased arms 132, 134, 136 and 138 mounted in frame 140 maintain the respective pushrods in engagement with the respective roller ratchets. The roller ratchets in turn drive output shaft 100.

Figure 10:
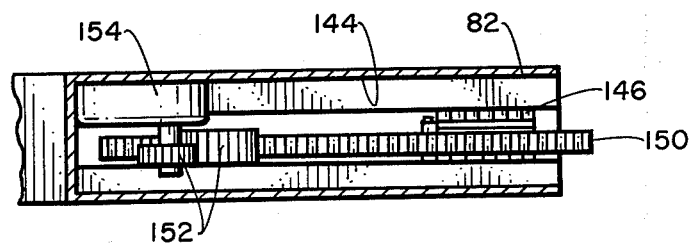
FIG. 10 is a sectional view of the lever arm gear box taken at 10—10 of FIG. 8.
Figure 8:
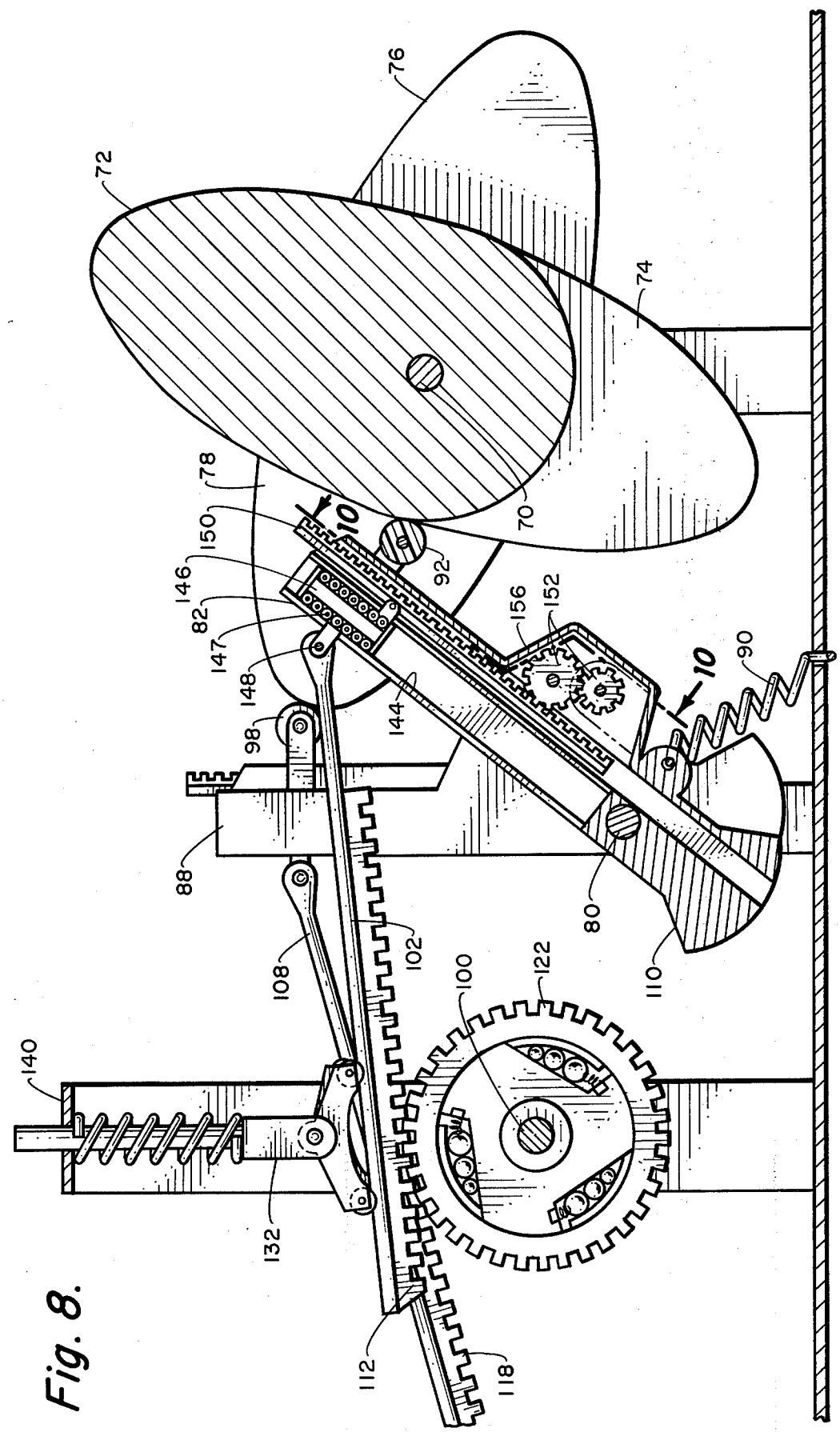
FIG. 8 is a sectional view of the cam-operated transmission of FIG. 5 taken at 8—8.

The output speed or rotation of output shaft 100 is varied by a variation of the pushrods as before. However, the variation of the pushrod connection is achieved through the gear box and bearing pad construction illustrated in FIG. 8, which is a section of the transmission system of FIG. 5, taken at 8—8. In FIG. 8 the lever 82 is constructed with a guide 144 for retaining a bearing pad 146 incorporating a plurality of needle bearings 147. The bearing pad 146 is connected to the respective pushrods by link pins 148. The bearing pad 146 freely moves up or down the guide or track 144 adjusting the position of the respective pushrpod on the respective oscillating lever. To move the bearing pad, a gear rack 150 is provided which is driven by gear box assembly 152 operated by an electric motor 154 (FIG. 10). Each respective lever can include a housing 156 to enclose the motor and gear box assembly 152, if desired. Springs 90 attached to each respective lever maintain the respective rollers 92, 94, 96 or 98 in contact with the respective cam on camshaft 70. The motor 154 can be operated by a manual switch or electrically linked to an rpm sensing device, such as a tachometer for automatic operation to keep an engine in the maximum economy and/or power of the rpm range.

Figure 6:
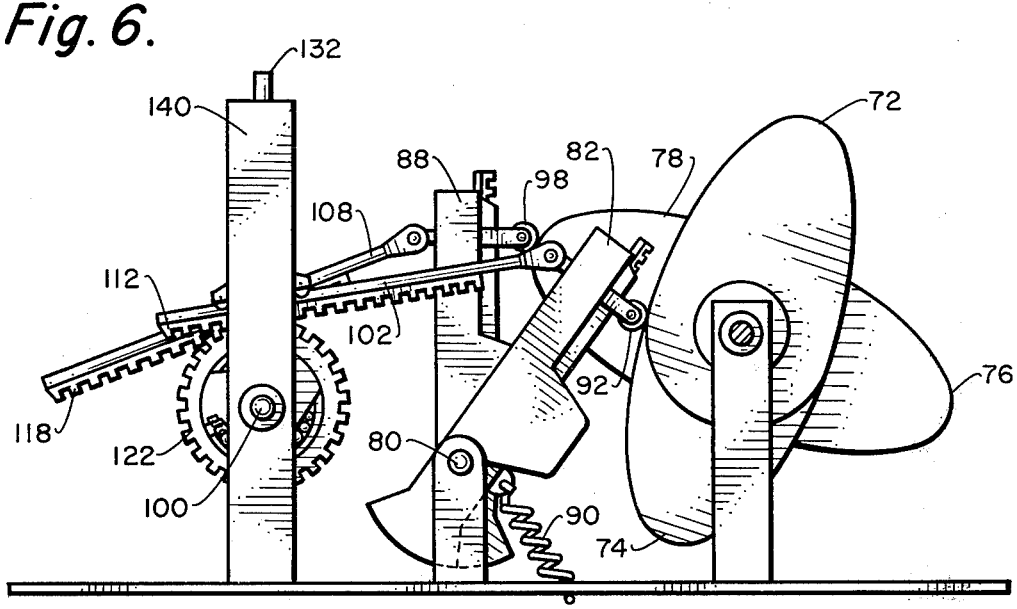
FIGS. 6 and 7 are side elevations of the camshaft transmission of FIG. 5 illustrating the operation.
Figure 7:
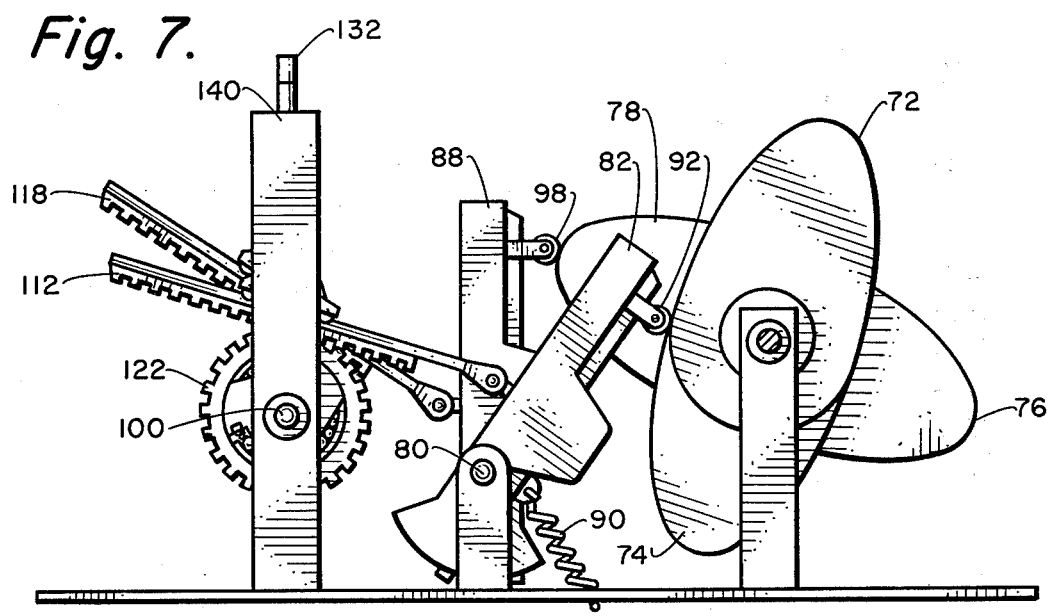

The cam-operated transmission provides a smooth transition from low to high speed or vice versa, as illustrated in FIGS. 6 and 7. In FIG. 6 the pushrods 102 through 108 are shown at the maximum speed position on the oscillating lever arms 82 through 88. These arms are moved to these positions by operation of the motor 154, which moves rack 150 up or down. The rack 150 being attached to the bearing pad 146 moves this bearing pad up and down in the guide or track 154, thus adjusting the position of the respective pushrod attached to the bearing pad. For low speed the rack would be moved down, moving the bearing pad close to the axis of rotation of pivot pin 80 as shown in FIG. 7. With the pushrods close to the axis of oscillation of the levers, minimum linear motion of the pushrods is produced, resulting in low-speed operation.

An important point to note is that the speed is continuously variable from the low-speed position illustrated in FIG. 7 up to the high-speed position illustrated in FIG. 6, without any steps. Thus, a continuously variable output on the shaft 100 can be produced by gradually moving the bearing pad 146 up the track 144 gradually and continuously increasing the output speed. The bearing pads 146 are supported in the track 144 by a plurality of needle bearings 147. To balance the levers, a counterweight 110 may be provided on the opposite end to reduce vibrations and provide smooth operation.

Thus, there has been disclosed a novel continuously variable mechanical transmission which may be operated manually or automatically by a suitable sensing circuit. The transmission provides a rotational input which is converted to a rectified linear motion by means of oscillating levers and variably connected pushrods. The linear motion of the pushrods is then reconverted to a rotational output which can be connected to a standard gear train for reverse or forward gearing. The oscillatory motion of the lever and linear motion of the pushrods can be provided by a variety of suitable means in addition to the crank and connecting rods or camshaft-operated means disclosed. The oscillating levers could be driven by a chain drive connected to the input shaft or to a bell crank type of system. Thus, there are a number and variety of methods for driving the lever system to provide an infinitely and continuously variable adjustment of the output.

Obviously, many modifications and variations of the present invention are possible in light of the above teachings. It is therefore to be understood that the full scope of the invention is not limited to the details disclosed herein, but may be practiced otherwise than as specifically described.

What is claimed is:

1. A variable speed transmission system comprising:
   a plurality of lever arms mounted for oscillation about a mutually coincident axis;
   oscillating means for oscillating said lever arms in a predetermined phase relationship about said axis;
   a pushrod connected to each lever arm;
   coupling means for coupling said pushrods to an output shaft; and
   variable adjusting means for variably adjusting the point of connection of said pushrods to said lever arms with respect to said axis whereby the length of travel of said pushrods is varied.

2. The transmission according to claim 1 wherein:
   there are at least four lever arms; and
   said oscillating means is adapted to oscillate said lever arm sequentially 90° out of phase with each other.

3. The transmission according to claim 2 wherein said oscillating means comprises:
   a plurality of levers connected to the free end of each lever arm; and
   a crankshaft connected to said levers and adapted to operate said levers in predetermined phase relationship.

4. The transmission according to claim 2 wherein said oscillating means comprises:
   a crankshaft;
   a plurality of cams on said crankshaft; and
   said cams engaging each rocker arm in the predetermined phase relationship.

5. The transmission according to claim 1 wherein said coupling means comprises:
   a rack gear on each pushrod;
   a plurality of gears on said output shaft engaged by said rack gear; and
   rectifying means for rectifying the output of said gears to drive said output shaft.

6. The transmission according to claim 5 wherein said rectifying means comprises:
   a plurality of ratchet gears rigidly attached to said output shaft; and
   a plurality of pawls attached to each of said plurality of gears and engaging each of said ratchet gears.

7. The transmission according to claim 5 wherein said rectifying means comprises:
   an overrunning clutch.

8. The transmission according to claim 1 wherein said variable adjusting means comprises:
   a longitudinal slot in each lever arm;
   a bearing pad in each longitudinal slot connected to the end of each pushrod; and
   moving means for moving said bearing pad in said longitudinal slot whereby the end of the pushrod may be moved in or out with respect to said axis.

9. The transmission according to claim 8 wherein said moving means comprises:
   a longitudinal rack gear in said slot;
   connecting means connecting said bearing pads to said rack gear; and
   electric drive means for driving said rack gear.

10. The transmission according to claim 8 wherein said moving means comprises:
    a shift arm for moving said bearing pad longitudinally in said slot.

11. A continuously variable transmission system comprising:
    a plurality of lever arms rotatably secured independently to a common axis;
    oscillating means for oscillating said lever arm; rectifying means for rectifying the oscillatory motion of said lever arms to linear motion;
    varying means for varying the amount of linear motion produced by said oscillating lever arms; and
    output translating means connected to said rectifying means for translating said linear motion to rotary output power.

12. The transmission system according to claim 11 wherein said rectifying means comprises:
    a plurality of pushrods connected to said lever arms.

13. The transmission system according to claim 12 wherein said output translation means comprises:
    a shaft;
    a plurality of ratchet gears on said shaft; and
    a rack gear on each of said pushrods engaging and turning said ratchet gear.

14. The transmission system according to claim 12 wherein:
    said varying means comprises:
    variable connecting means for varying the connection of said pushrods with respect to said axis whereby the length of the moment arm created by said lever arms may be increased or decreased.

15. The transmission system according to claim 12 wherein said oscillating means comprises:
    a master crank; and
    a plurality of connecting rods connecting said levers to said master crank.

16. The transmission system according to claim 12 wherein said oscillating means comprises:
    a camshaft; and
    a plurality of spaced cams on said camshaft abutting each lever arm.

17. The transmission system according to claim 14 wherein said variable connecting means comprises:
    an elongate slot in each lever arm traversing from the pivot point ot near the opposite end; and
    a pin engaging said slot connecting said pushrod for adjustment from near the pivot to the opposite end of the lever arm,
    whereby the moment arm is shortest when the pin is moved to a point near the pivot and is longest when the pin is moved to the opposite end of the slot.

18. The transmission system according to claim 14 wherein said variable connecting means comprises:
    a channel formed in said lever arm traversing from the pivot point to the opposite end;
    a bearing pad movably engaged in said channel;
    a pivot pin connecting the end of said pushrod to said bearing pad; and
    means for moving said pad along the channel in said lever arm.

19. The transmission system according to claim 18 wherein the moving means comprises:
    a rack gear connected for movement with said bearing pad; and
    an electric motor geared to said rack whereby the bearing pad may be moved up or down s ·¹ lever thereby varying the linear motion of said pushrod.

* * * * *